United States Patent
Kung et al.

(10) Patent No.: US 6,999,538 B2
(45) Date of Patent: Feb. 14, 2006

(54) DYNAMIC DIVERSITY COMBINER WITH ASSOCIATIVE MEMORY MODEL FOR RECOVERING SIGNALS IN COMMUNICATION SYSTEMS

(75) Inventors: Sun Yuan Kung, Princeton, NJ (US); Xinying Zhang, Princeton, NJ (US); Jinyun Zhang, New Providence, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 871 days.

(21) Appl. No.: 09/950,269

(22) Filed: Sep. 10, 2001

(65) Prior Publication Data

US 2003/0048861 A1   Mar. 13, 2003

(51) Int. Cl.
*H04B 7/10*   (2006.01)
*H04L 27/06*   (2006.01)

(52) U.S. Cl. ..................... 375/347; 375/340
(58) Field of Classification Search .............. 375/267, 375/296, 299, 341, 347; 455/65, 137, 267, 455/303; 706/14
See application file for complete search history.

(56) References Cited

U.S. PATENT DOCUMENTS

| | | | | |
|---|---|---|---|---|
| 4,519,096 A | * | 5/1985 | Cerny, Jr. ................ 455/137 |
| 5,208,816 A | | 5/1993 | Seshardi et al. ............. 371/43 |
| 5,282,225 A | | 1/1994 | Nikias et al. ............... 375/14 |
| 5,406,585 A | | 4/1995 | Rohani et al. ................ 375/94 |
| 5,453,940 A | * | 9/1995 | Broomhead et al. ......... 702/109 |
| 5,493,516 A | * | 2/1996 | Broomhead et al. ......... 702/109 |
| 5,621,769 A | * | 4/1997 | Wan et al. .................. 375/347 |
| 5,687,198 A | * | 11/1997 | Sexton et al. ............... 375/347 |
| 5,835,682 A | * | 11/1998 | Broomhead et al. .......... 706/14 |
| 5,905,721 A | | 5/1999 | Liu et al. .................... 375/374 |
| 6,128,355 A | | 10/2000 | Backman et al. ............ 375/347 |
| 6,144,711 A | | 11/2000 | Raleigh et al. .............. 375/374 |
| 6,829,312 B1 | * | 12/2004 | Laurila et al. ............... 375/340 |
| 2005/0141631 A1 | * | 6/2005 | Takano ....................... 375/267 |

OTHER PUBLICATIONS

Multichannel Blind Identification: From Subspace to Maximum Likelihood Methods — Tong et al., Proc. of IEEE, vol. 86, No. 10, Oct 1998.

* cited by examiner

*Primary Examiner*—Emmanuel Bayard
*Assistant Examiner*—Lawrence B. Williams
(74) *Attorney, Agent, or Firm*—Dirk Brinkman; Andrew J. Curtin

(57) ABSTRACT

A source signal transmitted through multiple channels having space, time and frequency diversities to generate multiple received signals is recovered by an iterative associative memory model with dynamic maximum likelihood estimation. A current symbol vector representing the multiple received signals is projected to a net-vector using a linear matrix operation with a weight matrix W. The weight matrix is obtained by a singular value decomposition of an input symbol sequence. The net-vector is mapped to a nearest symbol vector using a non-linear operation with an activation function. The projecting and mapping steps are repeated until the nearest symbol vector converges to a valid symbol vector representing the source signal.

9 Claims, 7 Drawing Sheets

DYNAMIC DIVERSITY COMBINER WITH ASSOCIATIVE MEMORY MODEL FOR RECOVERING SIGNALS IN COMMUNICATION SYSTEMS

FIELD OF THE INVENTION

The invention relates generally to communication systems, and more particularly to detecting signals transmitted through channels subject to multi-access interference, multi-path fading, varying power levels, and noise.

BACKGROUND OF THE INVENTION

There are a number of problems with communication systems. The major challenge in signal recovery in mobile communications is to mitigate the inter-symbol-interference effect due to multi-paths and unknown channel fading and distortion. In many communication systems, receivers observe the sum of multiple transmitted signals due to multi-paths, plus any noise. In addition, as a mobile transmitter proceeds along its route, the communication environment is constantly changing. That results in displaced received signals with respect to time and space. Therefore, many wireless communication systems operate under highly dynamic conditions due to the mobility of the mobile unit, varying environmental conditions, and the random nature of channel access. Detecting signals in a receiver encounters many difficulties.

For example, in wireless communication systems, mobile transmitters send symbols at a high data rate. Multiple copies of the signal with delays can interfere with the main signal. This is referred to as "delay spread," and causes inter-symbol interference (ISI). As a result, equalizers with hundreds of taps may be required.

Another major challenge in signal recovery is to deal with the co-channel interference. Multiple-access or multi-user-detection deals with detecting mutually interfering signals. In the multi-user case, receivers at base stations have to detect signals from multiple users from a combined channel. This is referred to as multi-access interference between different users. The superposition of the signals sent by different mobile transmitters occurs unintentionally. When the same frequency band is used simultaneously by multiple transmitters, as in cellular telephony, personal communications services (PCS), digital television (DTV) broadcasting, and wireless local loops (WLL), sometimes, it is necessary to cancel the co-channel interference from the other users in order to recover the signal for each user.

This interference problem assumes more serious proportions in cellular systems. Due to the mobility of the transmitters, signal strength varies. The strength of the signal from a transmitter closer to a base station is stronger than a signal from a transmitter further away. The signals from the closer transmitter can completely overpower the weaker signal. This is the so-called near-far problem.

All of these problems in mobile communication systems add up to a so-called "blind" channel estimation problem.

Blind Channel Estimation & Signal Recovery

FIG. 1 is a model of the "blind" channel problem. A source signal s 101 is transmitted through a channel H 110 subject to the above conditions. This results in an unknown signal y 102 having time and frequency dispersion. Additive noise 120 further complicates the problem, leading to a received signal r 103. In classic channel estimation, both the input and output signals are usually known. However, in blind channel estimation, only the received signal r 103 is available, and therefore, the effects of the channel H 110 and noise can only be blindly estimated and recovered.

Diversity Combining

Static Combiners

Therefore, it is practical to formulate the signal recovery process as a diversity combiner problem. When channels are non-time-varying, static combiners can be very effective. Static diversity techniques can combat fading channels, because the probability of simultaneous deep fading on all sub-channels is small.

In static diversity combining, a receiver is connected to multiple physically separated antennas. The receiver combines the received signals from each of the antennas. Because the antennas are in space separated, the signal strength in each antenna is independent. Thus, when there is deep fading for one antenna, another antennas probably has a relatively strong signal.

Many types of diversity combining methods are known, see Lee "Communication Design Fundamentals," Wiley, pp. 116–132, 1993. In a typical mobile communication system, antenna diversity is employed by providing base stations with multiple antennas. The signals received at the antennas are typically combined using maximum ratio combining (MRC). Currently, MRC is the preferred combining technique.

In MRC, the received signals are combined based on the assumption that the interference closely approximates white Gaussian noise. An exemplary MRC scheme is shown in FIG. 2. Each of the signals $r_1$, $r_2$, $r_3$ received at antennas 201–203 in the sub-channels is weighted proportional to the signal-to-noise ratio by selected weighting factors $\alpha_1$, $\alpha_2$, and $\alpha_3$ 211–213. The weighted signals 221–223 are combined 230. MRC does not consider correlation between received signals. Therefore, the received signals are detected and equalized individually, and combined by summing.

Dynamic Diversity Combining

However, when channels are dispersive and time varying, it is necessary to resort to a dynamic combining technique. In the prior art, blind single-input-multiple-output (SIMO) equalization, identification, and signal recovery have been used, see for example, Tong et al., "Multichannel Blind Identification: From Subspace to Maximum Likelihood Methods," Proc. of IEEE, Vol. 86, No. 10, Oct. 1998, and Giannakis et al., "Signal processing advances in wireless and mobile communications," Vol. 1 & 2, Prentice-Hall, 2001. Those all share the same basic theories and principles of exploiting inherent properties in transmission channel, e.g., constant modulus, cyclostationarity, higher-order statistics, and a slow time-varying source signal, that is, a finite alphabet.

Finite Alphabet Exclusiveness (FAE) Property

The finite alphabet exclusiveness property states that for a given polynomial $\tilde{f}(D)$, then $\tilde{f}(D) \tilde{s}(D)$ is a valid symbol sequence for any arbitrary symbol sequence $\tilde{s}(D)$, if and only if $\tilde{f}(D)$ is a pure delay, i.e., the overall transfer function $\tilde{f}(D)=D^k$ that models the combined delay of the h-domain of the channel and the g-domain of the receiver. This is called the FAE because it is impossible to produce a different valid symbol sequence by any FIR filter under a condition of "excitation" input.

Maximum Likelihood in the H-Domain

Maximum likelihood (ML) methods have frequently been used for estimating FIR parameters. For a general ML formulation, see e.g., Porat "Digital Processing of Random Signals," Prentice-Hall, 1993. Prior art DML methods focus on the channel side h-domain 220. An unknown parameter h and an input sequence s are determined so as to maximize a density function:

$$\{h^*, s^*\} = \arg\max f(x|h, s).$$

For a finite alphabet input, a class of iterative ML algorithms was described by Seshadri, "Joint data and channel estimation using blind trellis search techniques," Proceedings, Globecom'90, pp. 1659–1663, 1991, Ghosh et al. "Maximum likelihood blind equalization," Opt. Eng., Vol.31, No. 6, pp. 1224–1228, June 1992, U.S. Pat. No. 5,208,816 "Generalized Viterbi decoding algorithms," issued to Seshardi, et al. May 4, 1993, and U.S. Pat. No. 5,406,585 "Method and apparatus for trellis decoding in a multiple-access system," issued to Rohani, et al. on Apr. 11, 1995.

At an iteration j, with a guess of the initial input sequence $s^{(j)}$, the channel $h^{(j)}$ was estimated by solving the following least-square formulation:

$$h^{(j)} = \arg\min_h \|x - s^{(j)} * h^{(j)}\|.$$

In the same iteration j, with the new channel estimate $h^{(j)}$, a new input sequence, denoted as $s^{(j+1)}$, will be estimated by:

$$s^{(j+1)} = \arg\min_{ss} \|x - s^{(j+1)} * h^{(j)}\|,$$

where, ss stood for the valid symbol set. This step required a probability lattice and a Viterbi search, which are known to be computationally expensive.

Tong et al. used a deconvolutional approach, where an inverse system is represented by an IIR filter. The blind deconvolution approach is used for many applications, especially when the number of outputs equals the inputs, specifically a single input, single output (SISO) system. Giannakis et al. used a convolutional approach, where the inverse system is represented by several FIR filters. The convolutional approach, via FIR filters, offer an attractive alternative when the number of output signals exceeds the number of that of the input signals.

Therefore, there is a need for a dynamic diversity combiner that can recover signals in channels subject to multi-access interference, multi-path fading, varying power levels of transmitters, and noise. Furthermore, it is desired to recover the signals without having to determine channel parameters using resource consuming probabilistic lattices and time consuming searches.

SUMMARY OF THE INVENTION

The invention provides a dynamic diversity combiner with an associative memory model to recover blind signals from a single-input-multiple-output (SIMO) systems. The dynamic combiner applies finite impulse response (FIR) filters to the signals received on corresponding sub-channels to recover the original input source signals.

The combiner takes advantage of finite-alphabet "exclusiveness" (FAE), FIR signal recovery based on Bezout identity, and an associative memory model (AMM). Classically expressed, Bezout found that the degree of a final equation resulting from any number of complete equations in the same number of unknowns and of any degrees, is equal to the product of the degrees of the complete equations.

The combiner exploits the polynomial algebra property of the sub-channels and the "exclusiveness" property of the finite-alphabet inherent in digital communication systems.

From the polynomial algebra associated with the generalized Bezout identity, signal recoverability condition, and the relationship between the source and receiver data subspaces, the invention establishes a foundation for the finite-alphabet "exclusiveness" property inherent in digital communication applications. This leads to a deterministic maximum likelihood process based on the recovering FIR parameters.

The combiner according to the invention operates entirely in a "g-domain" of the receiver, rather than in a "h-domain" of the channel used by conventional methods. Therefore, the combiner according to the invention directly adapts the combiner, instead of first estimating channel parameters, and then adapting the combining to the estimated parameters.

Traditional cross relation (CR) methods, based on Bezout null space, first estimates the channel parameters. The AMM of the dynamic diversity combiner according to the invention eliminates this burden. Convergence properties of the associative memory model are utilized in terms of its perfect attractors.

The AMM finds the recovered symbol sequence ŝ, and the FIR parameters g, by maximizing a density function, $$\{g, \hat{s}\} = \arg\max f(\hat{s}|x, g).$$

At each iteration j, with a current estimate of the symbol vector, starting with an initial input sequence $\hat{s}^{(j)}$, the FIR parameters $g^{(j)}$ are be estimated by solving a weighted linear projection. Then, a new ŝ, $\hat{s}^{(j+1)}$ is estimated by a non-linear conversion. Consequently, the method according to the invention does not require a Viterbi-type search algorithm, thus to achieve substantial saving in the computation.

The method also relaxes the burden of having to estimate the exact inter-symbol interference (ISI) length. The AMM is used to realize the DML based g-domain method. An AMM weight matrix W is set based on a singular value decomposition (SVD). The method can also be applied to multiple-input-multiple-output (MIMO) signal recovery systems in other systems.

Specifically, a source signal transmitted through multiple channels having space, time and frequency diversities to generate multiple received signals is recovered by an iterative associative memory model with dynamic maximum likelihood estimation. A current symbol vector representing the multiple received signals is projected to a net-vector using a linear matrix operation with a weight matrix W. The weight matrix is obtained by a singular value decomposition of an input symbol sequence. The net-vector is mapped to a nearest symbol vector using a non-linear operation with an activation function. The projecting and mapping steps are repeated until the nearest symbol vector converges to a valid symbol vector representing the source signal.

DETAILED DESCRIPTION OF THE PREFERRED EMBODIMENT

System Overview

Figure 1:
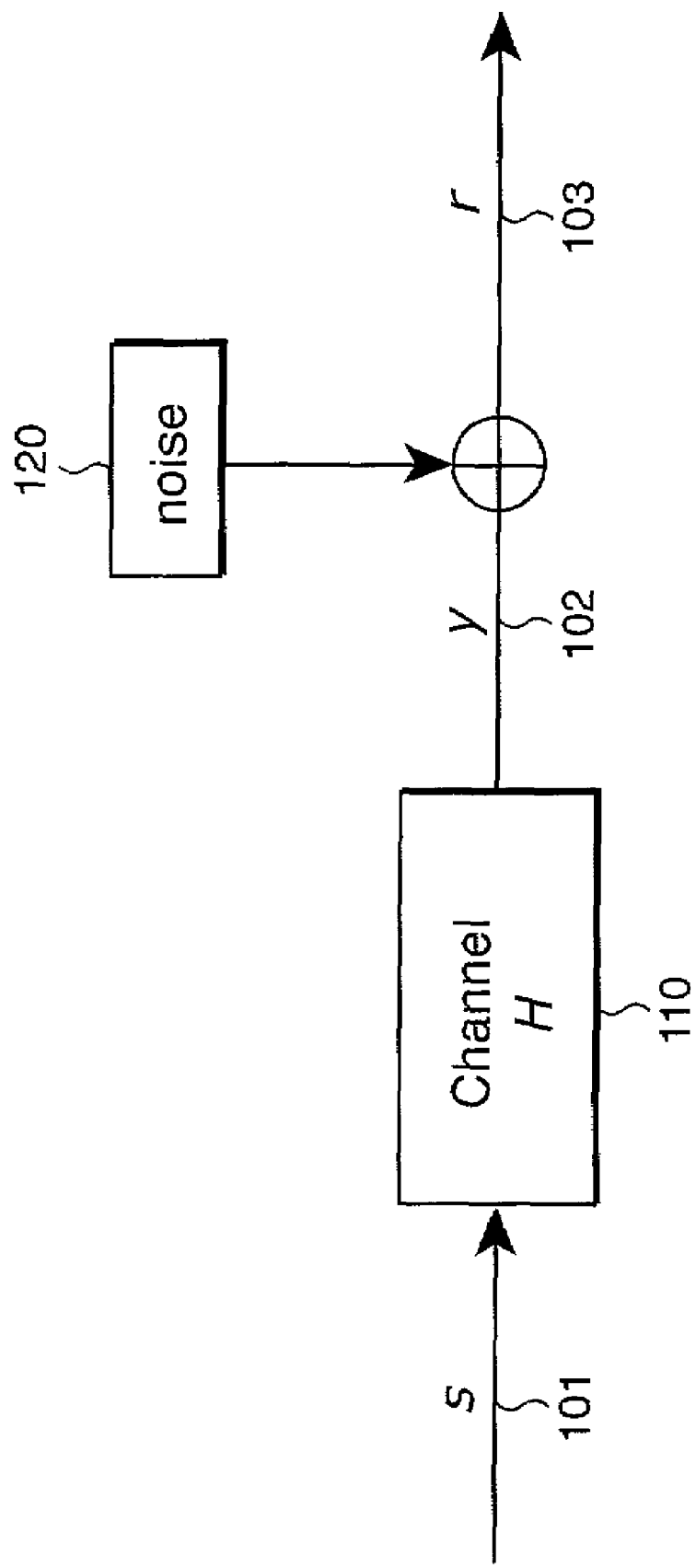
FIG. 1 is a block diagram of a model of a blind channel.
Figure 2:
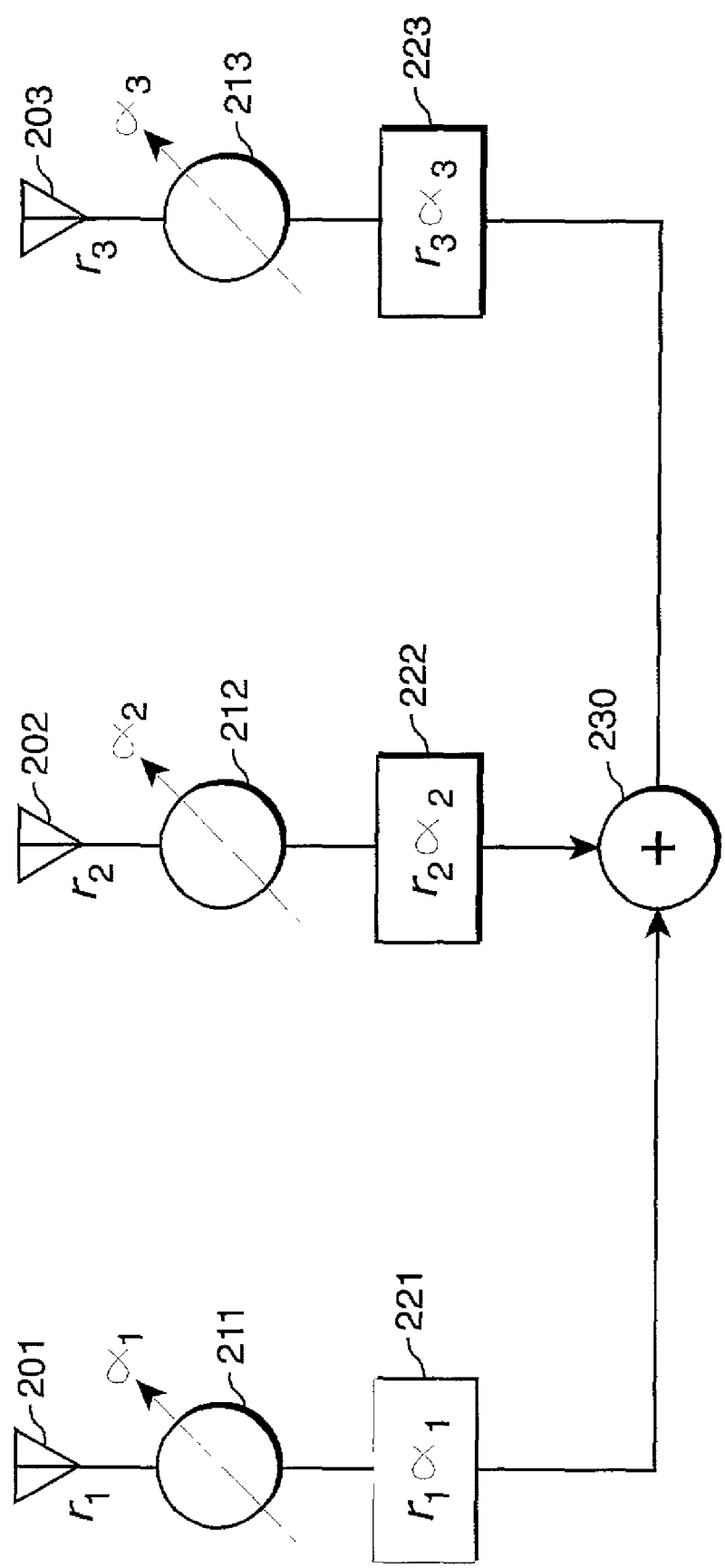
FIG. 2 is a block diagram of a system using maximum ratio combining.
Figure 3:
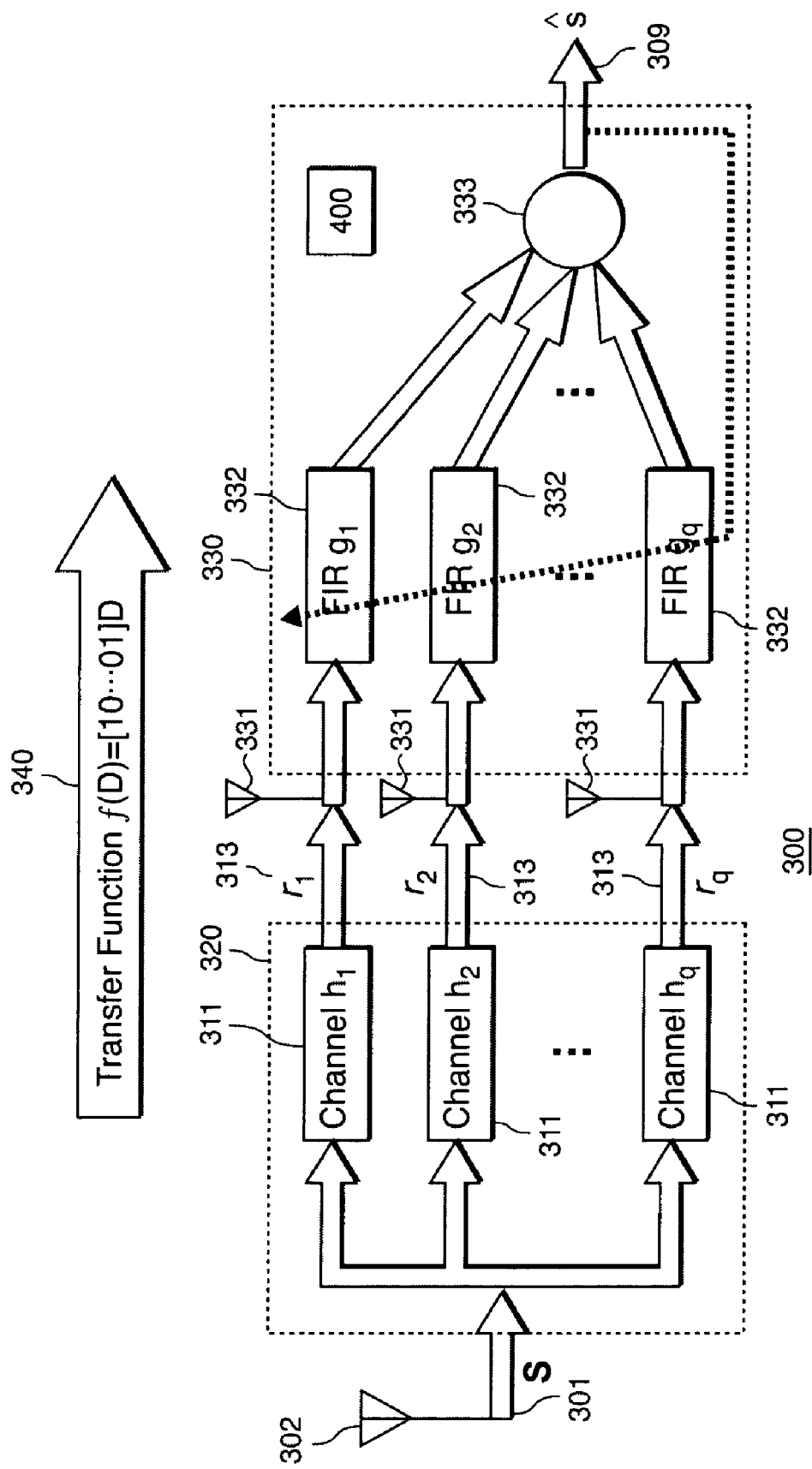
FIG. 3 is a block diagram of the dynamic diversity combiner according to the invention.

FIG. 3 shows a dynamic diversity combiner according to the invention. The combiner can be used with either a single-input-multiple-output (SIMO) system 300 having a "vector" channel, or a multiple-input-multiple-output (MIMO) system having a "matrix" channel. A source signal s 301 is radiated by a transmitter antenna 302. The source signal passes through multiple (q) channels $h_1, \ldots, h_q$ 311 in a "h-domain" 320, for example, the multi-path channels of a cellular telephone system. The channels are subject to multi-access interference, multi-path fading, varying power levels of transmitters, and noise, as described above. We use the term "channel" to generally refer to the total relationship between input symbols and output symbols in a communication system.

At a receiver, multiple receiver antennas 331 capture multiple received signals $r_1, \ldots, r_q$ 313. A corresponding number of FIRs 332 and diversity combiners 333 recover an estimate ŝ 309 of the source 301 in a receiver operating in a "g-domain" 330. The estimated or recovered symbol sequence ŝ 309 is a delayed version of the source signal s 301 so that the entire system can be modeled by an overall transfer function is $f(D)=D^k$ 340.

Figure 4:
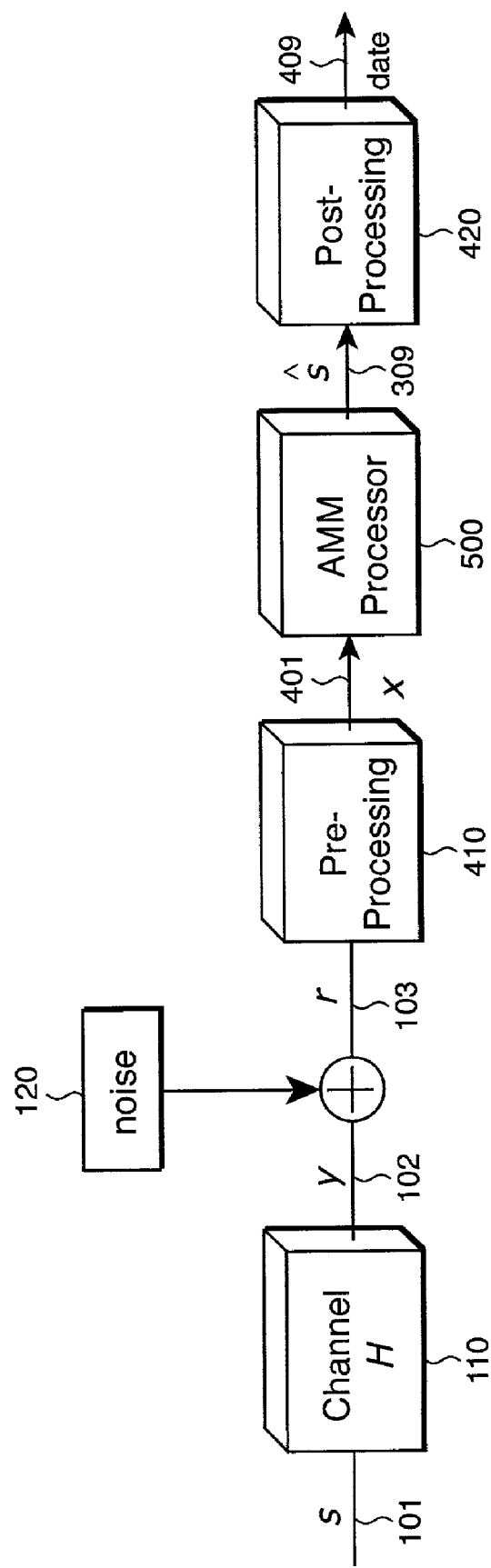
FIG. 4 is a block diagram of a communication system according to the invention.

FIG. 4 shows the entire communication system in greater detail. A pre-processing step 410 converts the received signal 401 to digital received symbol vectors (observations) x 401. The combiner 500 according to the invention generates the symbol sequence ŝ 309, and post-processing 420 converts the recovered signal 309 to data 409.

Figure 5:
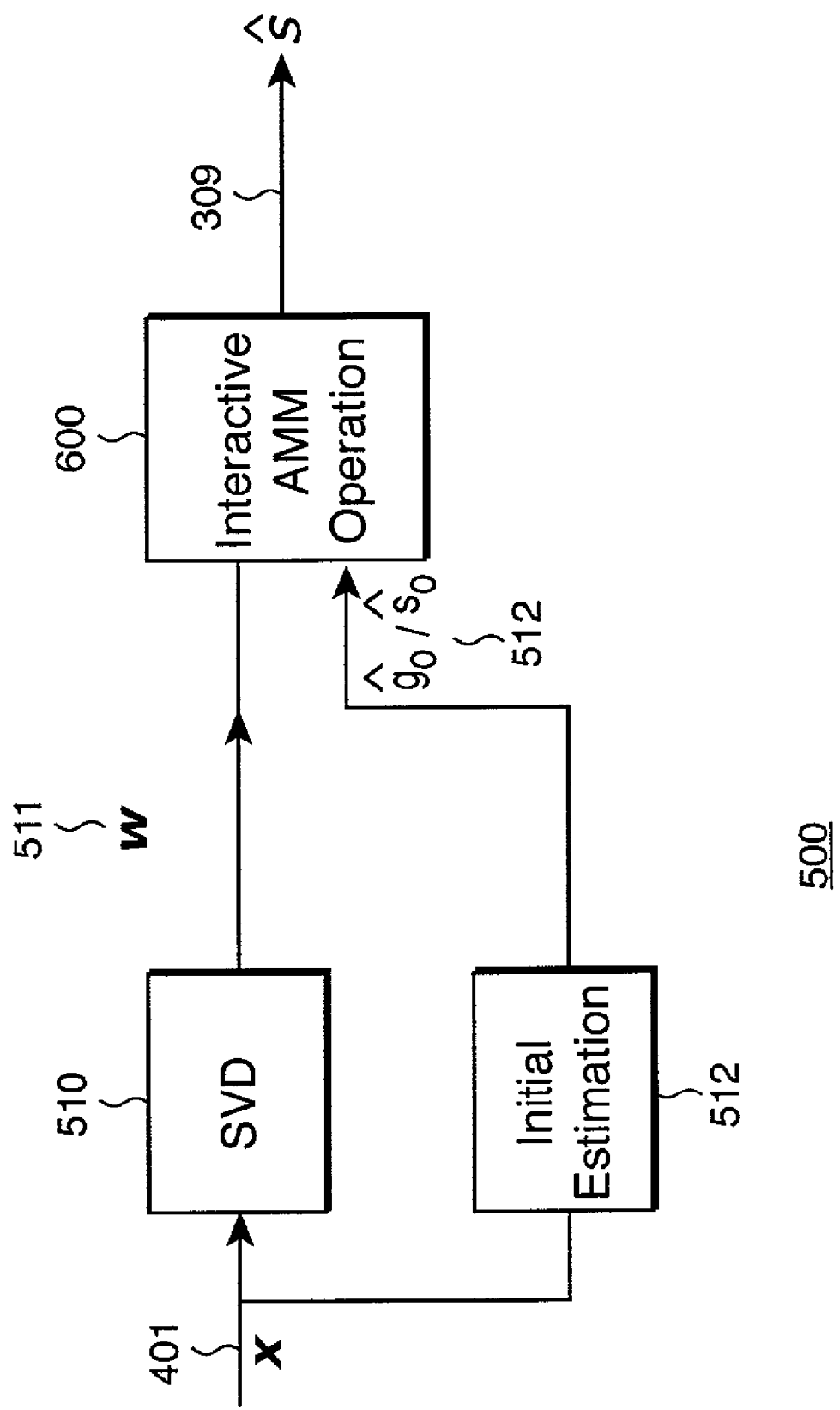
FIG. 5 is a detailed block diagram of the diversity combiner according to the invention.

FIG. 5 shows our combiner 500 in greater detail. A singular value decomposition (SVD) 510, described in greater detail below, is applied to the input symbol sequence x 401 to determine a weight matrix W 511. An initial estimate $ĝ_0/ŝ_0$ 512 of channel parameters g and a valid symbol sequence ŝ are also made. The initial estimate can be arbitrary or a last symbol recovered. The initial estimate is iterated by an associative memory model operation 600 until convergence on a valid symbol vector ŝ 309.

Figure 6:
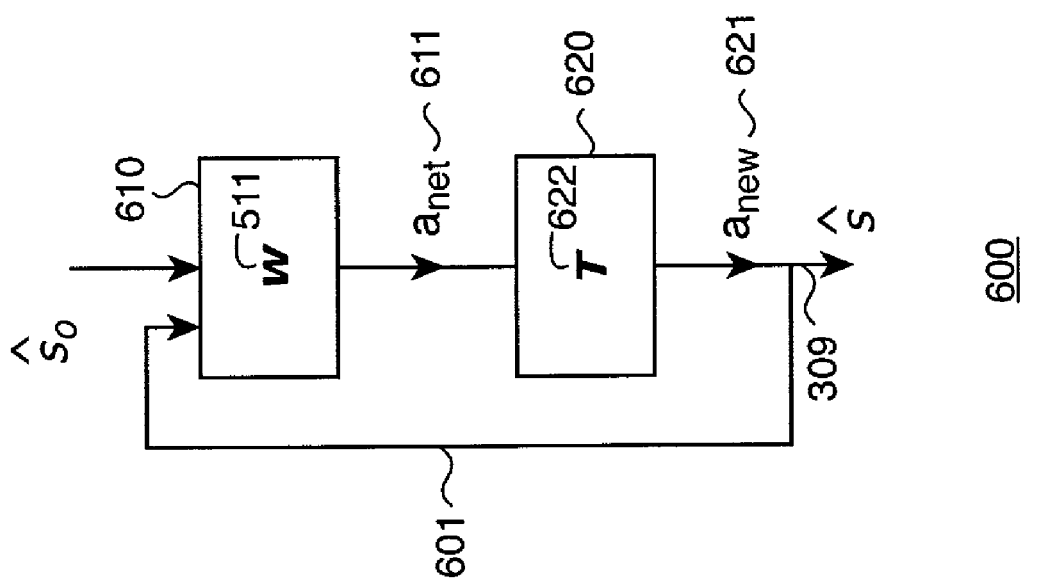
FIG. 6 is a block diagram of an iterative associative memory model according to the invention

FIG. 6 shows the iterations associative memory model 600 according to the invention. Step 610 projects the current symbol vector, initially $ŝ_0$, to a net-vector $\alpha_{net}$ 611 using the weighting matrix W 511. Step 620 maps the net-vector 611 to a nearest new vector $\alpha_{new}$ 621 using an activation function T 622, described in further detail below. These two steps are repeated until convergence, i.e., a valid symbol ŝ 309 is produced.

Deterministic Maximum Likelihood in the G-Domain

We use the FAE property to perform deterministic maximum likelihood estimation (DML) 500 in the receiver side "g-domain" 330. Our "[g, ŝ]-DML" method 500 finds the recovered symbol sequence ŝ 309 and the parameters g of the FIRs 332 that maximize a density function:

$$\{g, ŝ\}=arg\ max\ f(ŝ|x, g).$$

At an iteration j, an estimate of the input symbol sequence $ŝ^{(j)}$, the FIR parameters $g^{(j)}$ are estimated by solving a weighted density function:

$$g^{(j)}=arg\ min_g \|ŝ^{(j)}-x*g^{(j)}\|.$$

The density function in our [g, ŝ]-DML method has a weighting factor because the additive white Gaussian noise 120 on r 313 generates colored Gaussian noise at the output of the FIRs g 332 of FIG. 3.

According to the FAE property, if ŝ 309 adaptively approaches a valid symbol sequence, then the estimate ŝ is a delayed version of the original source signal 301. Therefore, the new estimate ŝ is a nearest symbol sequence such that:

$$ŝ^{(j+1)}=arg\ min_{ss} \|ŝ^{(j+1)}-x*g^{(j)}\|.$$

It is worth noting again that our [g, ŝ]-DML method effectively avoids the time consuming Viterbi search required by the prior art [h,s]-DML method.

Associative Memory Model

The objective of our AMM is to recover the source signal from an incomplete or partially corrupted signal. Our AMM has evolved from a linear associative memory with a primitive Hebbian learning rule to matrix feedback models. The Hebbian learning rule adjusts weights such that they reflect the input. The more probable an input, the larger the output will become, on average, e.g., see, Anderson et al., "A memory storage model utilizing spatial correlation functions," Kybenetik Biological Cybernetics, Vol.5, 1968. Kohonen, "Correlation matrix memories," IEEE Transactions on Computers, C-21, 353–359, 1972. Nakano, "Association—A model of associative memory", IEEE Transactions on Systems, Man and Cybernetics, SMC-2, 1972, and Hopfield et al., "Neural Network and Physical Systems with Emergent Collective Computational Abilities," Proceedings of the National Academy of Science, Vol.79, 2554–2558, 1982. We use a feedback-type AMM to recover the valid symbol vectors 309.

Our associative memory model, AMM, is represented by its weight matrix W 511. Moreover, the matrix W 511 is a Hermitian matrix, i.e., conjugate-symmetric and normalized with non-zero singular values identically equal to one. Each iteration in the AMM operation 600 comprises two steps.

A linear matrix operation 610, with the weight matrix W 511, projects a current symbol vector to a net-vector $A_{net}=WA_{old}$, and a non-linear operation 620, with the activation function T 622, maps the net-vector to a nearest symbol vector $A_{new}=T[A_{net}]$, 621, based on some distance metric. Basically, the activation function T 622 quantitizes the net-vector to a nearest discrete value. The iterative AMM operation 600 converges to an attractor A when A is a valid symbol vector and $A_{valid}=T[WA_{old}]$.

Figure 7:
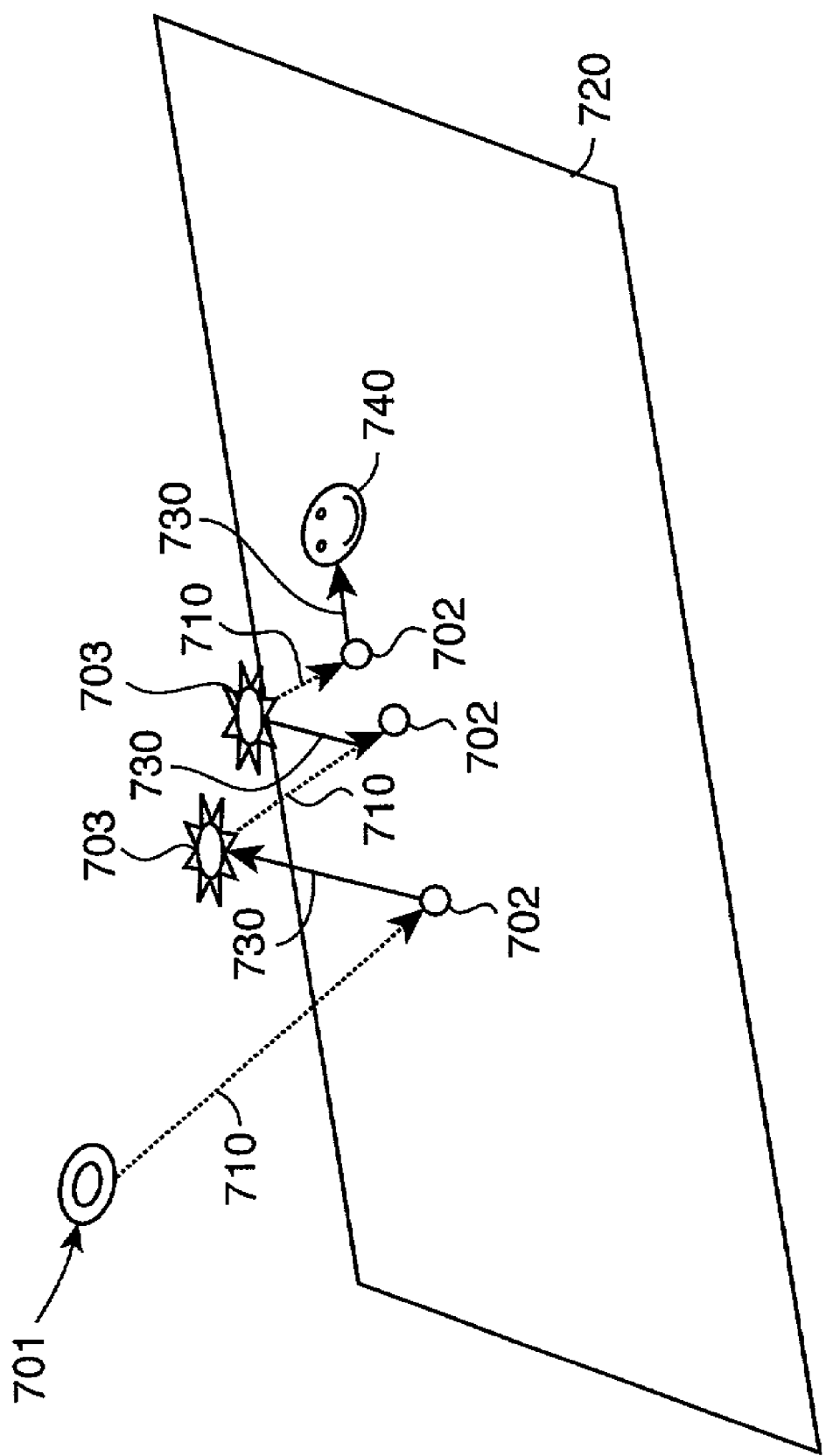
FIG. 7 is a schematic of an iterative associative memory model used by a method according to the invention.

FIG. 7 shows the iterative DML method 600 graphically. Starting with an initial symbol vector 701, step 710 projects a current vector A to a column subspace of W, shown as the x*g-plane 720. It is unlikely that the projected net-vector 702 is a valid symbol vector.

Therefore, the non-linear mapping 430 converts the net-vector 702 to a nearest symbol vector 703. The two steps are repeated until the net-vector converges to a valid symbol vector 740 on or close to the x*g-plane 720.

Weight Matrix

The Cholesky decomposition is an efficient and numerically stable way of obtaining a solution for the Hermitian matrix W factorization 510 of FIG. 5, see Golub et al. "Matrix Computations," Johns Hopkins University Press, 1989. The AMM weight matrix W 511 is set to $W^{(p)}=UU^H$. The matrix U is formed from right singular vectors corresponding to non-zero singular values of $\Gamma^p(x)$. That is, the weight matrix W 511 can be extracted by a singular value decomposition (SVD) $\Gamma^p(x)=U\ \Sigma\ V$ 510, where $\Gamma^p(x)$ is a block Toeplitz matrix with ρ blocks of columns, where ρ is the recordable order of the FIR systems, see Grenander et al. "Toeplitz Forms and Their Applications," University of Calif. Press, Berkeley and Los Angeles, 1958. Generally, such matrices are covariance matrices of weakly stationary stochastic time series, and matrix representations of linear time-invariant discrete time filters.

The non-linear operation 620 with the activation function T 622 maps the net-vector 611 to the nearest symbol vector 621 by quantization. Therefore, each iteration has two steps. The current vector 601 is projected 610 to the x*g-plane, resulting in the net-vector 611, and the net-vector 611 is mapped to the nearest symbol vector 621, until convergence to a valid symbol vector 309.

Relationship Between AMM and DML

A cost function to be evaluated can be expressed in an expanded vector/matrix form as:

$$\|\hat{a}\hat{c};-\hat{7}\hat{0}\hat{s}\hat{a}\hat{c}\hat{x};[<\overline{a]cx;}\ \hat{a}\hat{d}-\Gamma^p(x)\vec{g}\|.$$

Note that if the SIMO is recoverable of order ρ, and if the source signal happens to be perfectly estimated, then $\Gamma^{p+d}(\hat{a}\hat{c};-\hat{7}\hat{0}\hat{s}\hat{a}\hat{c}\hat{x};[<\overline{a]cx;}\ \hat{a}\hat{d})=\Gamma^p(x)G$, where, d is the channel impulse length. This implies that the $(k+1)^{th}$ column of G, tentatively denoted by $\vec{g}$, recovers the source sequence with k-unit system delay. Similarly, the vector $\vec{g}$ can be determined after an estimation of the k-delay source sequence is derived, tentatively denoted by ŝ. In this case, the estimate for $\vec{g}$ is $\Gamma^p(x)^+\hat{a}\hat{c};-\hat{7}\hat{0}\hat{s}\hat{a}\hat{c}\hat{x};[<\overline{a]cx;}\ \hat{a}\hat{d}$, and we obtain a new unweighted cost function:

$$\|\hat{a}\hat{c};-\hat{7}\hat{0}\hat{s}\hat{a}\hat{c}\hat{x};[<\overline{a]cx;}\ \hat{a}\hat{d}-\Gamma^p(x)\Gamma^p(x)^+$$
$$\hat{a}\hat{c};-\hat{7}\hat{0}\hat{s}\hat{a}\hat{c}\hat{x};[<\overline{a]cx;}\ \hat{a}\hat{d}\|=\|$$
$$\hat{a}\hat{c};-\hat{7}\hat{0}\hat{s}\hat{a}\hat{c}\hat{x};[<\overline{a]cx;}\ \hat{a}\hat{d}-UU^H$$
$$\hat{a}\hat{c};-\hat{7}\hat{0}\hat{s}\hat{a}\hat{c}\hat{x};[<\overline{a]cx;}\ \hat{a}\hat{d}\|.$$

Such an unweighted cost function provides for the fact that the vector $\vec{g}$, representing the estimated FIR parameters need not to be explicitly computed as in the prior art. Thus, the equations are effectively combined into one as:

$$\hat{a}\hat{c};-\hat{7}\hat{0}\hat{s}\hat{a}\hat{c}\hat{x};[<\overline{a]cx;}\ \hat{a}\hat{d}^{(j+1)}=\arg\min\ \|$$
$$\hat{a}\hat{c};-\hat{7}\hat{0}\hat{s}\hat{a}\hat{c}\hat{x};[<\overline{a]cx;}\ \hat{a}\hat{d}^{(j+1)}-UU^H$$
$$\hat{a}\hat{c};-\hat{7}\hat{0}\hat{s}\hat{a}\hat{c}\hat{x};[<\overline{a]cx;}\ \hat{a}\hat{d}\|.$$

This is exactly the iterations of our method described above.

Effect of the Invention

With quadrature phase-shift keying (QPSK) symbols we can obtain the following results. The initial vectors have average error-rate of 30%, possibly due to sign switching. The statistical average error rates for recovered symbol vectors is 0.89% with a signal-to-noise ratio (SNR) of 7 dB. Our g-domain method is also robust with respect to order estimation, particularly when the delay in the system is in the middle of the range or approximately the ISI length. For bi-phase shift keying (BSPK) symbols, the average error is less than 1% for a SNR of 5 dB or higher. Best results are obtained when the number of sub-channels is slightly smaller than the ISI length, e.g. q=4<ISI=6.

Applications

Our dynamic diversity combiner has a number practical communications applications, e.g., computer networks, high-definition television (HDTV) broadcasting, cellular telephony. Outside of the communications arena, blind channel estimation can be used in the geo-sciences, image restoration problems, and other image deblurring applications. Our combiner can be applied to many applications where the input data have known probabilistic description, such as distributions and moments. In such cases, the problem of estimating the channel using the output statistics is related to time series analysis. In communications applications, as described above, the input signals have the finite alphabet property, or otherwise exhibit cyclostationarity.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for dynamically recovering a source signal transmitted through multiple channels having space, time and frequency diversities to generate multiple received signals, comprising:
   projecting a current symbol vector representing the multiple received signals to a net-vector using a linear matrix operation with a weight matrix W;
   mapping the net-vector to a nearest symbol vector using a non-linear operation with an activation function T; and
   repeating the projecting and mapping until the nearest symbol vector converges to a valid symbol vector representing the source signal.

2. The method of claim 1 wherein the weight matrix is conjugate-symmetric and normalized with non-zero singular values identically equal to one.

3. The method of claim 1 wherein the mapping further comprises:
   quantizing the net-vector.

4. The method of claim 1 wherein the channels operate in a h-domain and a receiver operates in a g-domain, and further comprising:
   performing the projecting and mapping steps only in the g-domain.

5. The method of claim 1 further comprising:
   estimating channel parameters g by maximizing a weighted density function $\{g, \hat{s}\}$=arg max $f(\hat{s}|x, g)$, where ŝ represents the source signal and x the multiple received signals.

6. The method of claim 1 wherein the weight matrix W is a singular value decomposition of the received signals.

7. The method of claim 1 wherein the weight matrix W is set to $W^{(p)}=UU^H$, where the matrix U is formed from right singular vectors corresponding to non-zero singular values of a decomposition $\Gamma^p(x)=U\ \Sigma\ V$, where $\Gamma^p(x)$ is a block Toeplitz matrix with ρ blocks of columns.

8. The method of claim 1 wherein multiple sources generate the multiple received signals.

9. A dynamic diversity combiner for recovering a source signal transmitted through multiple channels having space, time and frequency diversities to generate multiple received signals, comprising:
   means for projecting a current symbol vector representing the multiple received signals to a net-vector using a linear matrix operation with a weight matrix W;
   means for mapping the net-vector to a nearest symbol vector using a non-linear operation with an activation function T; and
   means for repeating the projecting and mapping until the nearest symbol vector converges to a valid symbol vector representing the source signal.

* * * * *